United States Patent
Schloemer

(10) Patent No.: US 12,413,296 B2
(45) Date of Patent: Sep. 9, 2025

(54) DATA TRANSMISSION SYSTEMS AND METHODS FOR LOW AND VERY LOW EARTH ORBIT SATELLITE COMMUNICATIONS

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 906 days.

(21) Appl. No.: 17/367,663

(22) Filed: Jul. 6, 2021

(65) Prior Publication Data
US 2022/0029699 A1    Jan. 27, 2022

Related U.S. Application Data

(60) Provisional application No. 63/182,341, filed on Apr. 30, 2021, provisional application No. 63/136,664, (Continued)

(51) Int. Cl.
*H04B 7/185* (2006.01)
*G01S 19/01* (2010.01)

(52) U.S. Cl.
CPC .......... *H04B 7/18515* (2013.01); *G01S 19/01* (2013.01); *H04B 7/18519* (2013.01); *H04B 7/18521* (2013.01)

(58) Field of Classification Search
None
See application file for complete search history.

(56) References Cited

U.S. PATENT DOCUMENTS

| 3,017,777 A | 1/1962 | Haeussermann |
| 3,815,140 A | 6/1974 | Buehler et al. |
| (Continued) | | |

FOREIGN PATENT DOCUMENTS

| CN | 102027695 | 4/2011 |
| CN | 1728714 | 7/2011 |
| (Continued) | | |

OTHER PUBLICATIONS

Walsh, J., "Reducing Spacecraft Drag in Very Low Earth Orbit through Shape Optimization," 7th European Conf. for Aeronautics and Aerospace Sciences (EUCASS) (Copyright 2017).
(Continued)

*Primary Examiner* — Willie J Daniel, Jr.
(74) *Attorney, Agent, or Firm* — David M. Quinlan, P.C.

(57) ABSTRACT

A satellite used in a multi-satellite LEO/VLEO constellation is configured to reduce drag and increase satellite life in orbit by virtue of its streamlined casing. The satellite has a longitudinal axis defining the y-axis of a right-handed x, y, z coordinate system and contains a plurality of antennas for receiving and transmitting radio signals, rechargeable batteries, and solar panels. Control circuitry in the satellite actuates attitude stabilizing and controlling mechanisms by selectively connecting the batteries to the stabilizing mechanism for urging the satellite into an operational attitude with the y-axis of the casing substantially aligned with earth's magnetic field. The controlling mechanism sets a tilt angle denoting the amount of rotation of the satellite about its y-axis to point the solar panels and/or the antennas in desired directions.

14 Claims, 3 Drawing Sheets

Related U.S. Application Data filed on Jan. 13, 2021, provisional application No. 63/132,026, filed on Dec. 30, 2020, provisional application No. 63/061,528, filed on Aug. 5, 2020, provisional application No. 63/050,142, filed on Jul. 10, 2020.

(56) References Cited

U.S. PATENT DOCUMENTS

| | | | |
|---|---|---|---|
| 4,937,822 A | 6/1990 | Weddle et al. | |
| 4,965,850 A | 10/1990 | Schloemer | |
| 5,274,840 A | 12/1993 | Schwendeman | |
| 5,303,286 A | 4/1994 | Wiedeman | |
| 5,410,728 A | 4/1995 | Bertiger et al. | |
| 5,551,624 A | 9/1996 | Horstein et al. | |
| 5,561,836 A | 10/1996 | Bowles et al. | |
| 5,566,354 A | 10/1996 | Schloemer | |
| 5,574,968 A | 11/1996 | Olds et al. | |
| 5,641,135 A | 6/1997 | Stuart et al. | |
| 5,716,029 A | 2/1998 | Spitzer et al. | |
| 5,757,784 A | 5/1998 | Liebowitz et al. | |
| 5,793,842 A | 8/1998 | Schloemer et al. | |
| 5,812,545 A | 9/1998 | Liebowitz et al. | |
| 5,959,999 A | 9/1999 | An | |
| 6,208,312 B1 | 3/2001 | Gould | |
| 6,219,003 B1 | 4/2001 | Chandler | |
| 6,295,283 B1 | 9/2001 | Falk | |
| 6,404,769 B1 | 6/2002 | Kapoor | |
| 6,459,899 B1 | 10/2002 | Schloemer | |
| 6,775,251 B1 | 8/2004 | Wiedeman et al. | |
| 6,823,170 B1 | 11/2004 | Dent | |
| 6,985,454 B1 | 1/2006 | Wiedeman et al. | |
| 7,292,186 B2 | 11/2007 | Miller et al. | |
| 7,502,382 B1 | 3/2009 | Liu et al. | |
| 7,925,167 B1 | 4/2011 | Kozubal et al. | |
| 8,816,933 B2 | 8/2014 | Scott et al. | |
| 8,918,047 B1 | 12/2014 | Teller et al. | |
| 9,035,839 B2 | 5/2015 | Scott et al. | |
| 9,220,047 B2 | 12/2015 | Furukawa et al. | |
| 9,748,989 B1 | 8/2017 | Freedman et al. | |
| 10,063,309 B2 | 8/2018 | Laufer et al. | |
| 10,084,536 B1 | 9/2018 | Schloemer | |
| 10,084,615 B2 | 9/2018 | Hong et al. | |
| 10,085,200 B1 | 9/2018 | Schloemer | |
| 10,291,316 B1 | 5/2019 | Schloemer | |
| 10,447,381 B2 | 10/2019 | Schloemer | |
| 10,770,790 B1 | 9/2020 | Mahanfar | |
| 10,784,953 B2 | 9/2020 | Schloemer | |
| 10,791,493 B2 | 9/2020 | Schloemer | |
| 10,979,136 B2 | 4/2021 | Schloemer | |
| 10,988,962 B2 | 4/2021 | Park et al. | |
| 11,038,586 B2 | 6/2021 | Schloemer | |
| 11,206,079 B2 | 12/2021 | Schloemer | |
| 11,211,702 B1 * | 12/2021 | Mahanfar | H01Q 5/42 |
| 11,356,921 B2 | 6/2022 | Schloemer | |
| 2005/0207375 A1 | 9/2005 | Schiff | |
| 2006/0023717 A1 | 2/2006 | Trachtman et al. | |
| 2007/0070939 A1 | 3/2007 | Hottinen | |
| 2007/0075896 A1 | 4/2007 | Whitehead et al. | |
| 2008/0056189 A1 | 3/2008 | Hudson et al. | |
| 2008/0219266 A1 | 9/2008 | Agarwal et al. | |
| 2008/0278397 A1 | 11/2008 | Rao et al. | |
| 2010/0128678 A1 | 5/2010 | Thesling | |
| 2010/0217879 A1 | 8/2010 | Weiner | |
| 2011/0287791 A1 | 11/2011 | Fujishima et al. | |
| 2013/0148250 A1 | 6/2013 | Day et al. | |
| 2013/0293415 A1 | 11/2013 | Gutt et al. | |
| 2014/0017992 A1 | 1/2014 | Bigras et al. | |
| 2014/0027576 A1 | 1/2014 | Boshuizen et al. | |
| 2014/0032022 A1 | 1/2014 | Caullier et al. | |
| 2014/0177522 A1 | 6/2014 | Marshack et al. | |
| 2014/0240497 A1 | 8/2014 | Shefer | |
| 2015/0001345 A1 | 1/2015 | Polle | |
| 2015/0131512 A1 | 5/2015 | Lauer et al. | |
| 2016/0037434 A1 | 2/2016 | Gopal et al. | |
| 2016/0080072 A1 | 3/2016 | Baudoin et al. | |
| 2016/0112117 A1 | 4/2016 | Platzer et al. | |
| 2016/0365629 A1 | 12/2016 | Yao et al. | |
| 2017/0070939 A1 | 3/2017 | Chong et al. | |
| 2017/0155443 A1 | 6/2017 | Haziz et al. | |
| 2018/0156924 A1 | 6/2018 | Reedy et al. | |
| 2018/0346155 A1 | 12/2018 | Spangelo et al. | |
| 2019/0027835 A1 * | 1/2019 | Hoyt | H01Q 21/0087 |
| 2019/0033891 A1 | 1/2019 | Giraud | |
| 2019/0344910 A1 | 11/2019 | Reedy et al. | |
| 2019/0353799 A1 | 11/2019 | Grant et al. | |
| 2020/0024012 A1 | 1/2020 | Fortezza | |

FOREIGN PATENT DOCUMENTS

| | | |
|---|---|---|
| CN | 103281115 | 9/2013 |
| CN | 102301774 | 4/2014 |
| CN | 104661276 A | 5/2015 |
| CN | 106788682 A | 5/2017 |
| CN | 106664507 | 12/2020 |
| EP | 0611500 | 7/1999 |
| EP | 1523062 | 4/2005 |
| IN | 4263/CHE/2013 | 3/2015 |
| JP | 677889 | 3/1993 |
| WO | 2009123112 | 10/2009 |
| WO | 2009139778 | 11/2009 |
| WO | 2015184055 | 12/2015 |
| WO | 2016060954 | 4/2016 |
| WO | 2019140156 | 7/2019 |

OTHER PUBLICATIONS

Majid, A, et al., "Aerodynamic Drag Computation of Lower Earth Orbit (LEO) Satellites," Journal of Space Technology, vol. 8, No. 1, pp. 82-89 (Jul. 2018).
Long, K., "Amazon Internet Program, Project Kuiper, to Launch Satellite," The Seattle Times (Apr. 20, 2021), https://www.govtech.com/news/amazon-internet-program-project-kuiper-to-launch-satellite.html (last visited Jun. 14, 2021).
Howell, E., SpaceX's Starlink Internet Satellites to Connect with Google Cloud Systems; Space.com (May 2021), https://www.space.com/spacex-starlink-internet-satellites-google-cloud (last visited Jun. 14, 2021).
"Satellite Orbital Lifetimes," Australian Space Academy (https://www.spaceacademy.net.au/watch/debris/orblife.htm, last visited Jun. 14, 2021).
"Starlink," Wikipedia (https://en.wikipedia.org/wiki/Starlink, last visited Oct. 14, 2021).
International Search Report and Written Opinion dated Sep. 16, 2021, in PCT appln. No. PCT/US2021/40408.
Official Action in Chinese Appln. No. 2018800627936, dated Jul. 28, 2021.
Cox, Donald C., "Wireless Network Access for Personal Communications," IEEE Communications Magazine (Dec. 1992), pp. 96-115.
Satellite Systems Engineering in an IPv6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Iridium (last visited May 9, 2017).
"Project Loon," Wikipedia, https://en.wikipedia.org/wiki/Project_Loon (last visited Sep. 27, 2017).
Wade, P., "Multiple Reflector Dish Antennas," copyright 2004.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
International Search Report and Written Opinion dated Nov. 12, 2019, in PCT appln. No. PCT/US2019/041428.

(56) References Cited

OTHER PUBLICATIONS

Supplementary European Search Report dated Feb. 25, 2020, in EP appln. No. 17844319.8 (PCT/US2017/048110).
Chakraborty, D., "Survivable Communication Concept Via Multiple Low Earth-Orbiting Satellites," IEEE Transactions on Aerospace and Electronic Systems, vol. 25, No. 6 (Nov. 1989), pp. 879-889.
Chung, Soon-Jo, et al., "Review of Formation Flying and Constellation Missions Using Nanosatellites," Journal of Spacecraft and Rockets, vol. 53, No. 3, pp. 567-578 (May-Jun. 2016).
Qu, et al., "LEO Satellite Constellation for Internet of Things," IEEE Access, vol. 5, p. 18391-18401, Digital Object Identifier 10.1109/ACCESS.2017.2735988, first pub. Aug. 4. 2017 (Sep. 27, 2017).
EPO office action in EP appln. No. 18860787.3-1215, May 21, 2021.
Supplementary European Search Report in EP Appln. No. 21838154.9, Jun. 14, 2024.

* cited by examiner

DATA TRANSMISSION SYSTEMS AND METHODS FOR LOW AND VERY LOW EARTH ORBIT SATELLITE COMMUNICATIONS

CROSS-REFERENCE TO RELATED APPLICATIONS

This application claims benefit of U.S. provisional application No. 63/050,142 filed Jul. 10, 2020, U.S. provisional application No. 63/061,528 filed Aug. 5, 2020, U.S. provisional application No. 63/132,026 filed Dec. 30, 2020, U.S. provisional application No. 63/136,664 filed Jan. 13, 2021, and U.S. provisional application No. 63/182,341 filed Apr. 30, 2021, the entire contents of all of which are incorporated by reference as part of the present disclosure as if set out in full herein. Also incorporated by reference as part of the present disclosure as if set out in full herein is the assignee's U.S. Pat. No. 10,979,136 issued Apr. 13, 2021, and application Ser. No. 17/322,950 filed May 18, 2021 {now U.S. Pat. No. 11,870,543 issued Jan. 9, 2024).

BACKGROUND OF THE DISCLOSURE

There is considerable interest by many companies in developing systems using low-earth orbit ("LEO") and very low-earth orbit ("VLEO") satellites to provide email and internet access to users on the ground. Two prominent examples are Jeff Bezos's Amazon "Project Kuiper" and Elon Musk's Space X "Starlink®"system. See Long, K., "Amazon Internet Program, Project Kuiper, to Launch Satellite," *The Seattle Times* (Apr. 20, 2021), https://www.govtech.com/news/amazon-internet-program-project-kuiper-to-launch-satellite.html (last visited Jun. 14, 2021), and Howell, E., "SpaceX's Starlink Internet Satellites to Connect with Google Cloud Systems; Space.com (May 2021), https://www.space.com/spacex-starlink-internet-satellites-google-cloud (last visited Jun. 14, 2021). One of the reasons that LEO satellites are of particular interest for such applications is that they can provide sufficient signal strength to transmit and receive signals from mobile terrestrial system nodes with limited power, such as smartphones and tablet computers. For present purposes, an LEO satellite is generally considered to be one orbiting at an altitude of up to about 1,000 miles, and the VLEO regime is considered to include altitudes less than about 300 miles, although there is no universally accepted definition of these terms, nor does the present disclosure mean to imply one.

Satellites in lower orbital regimes present a number of issues that must be addressed to support a successful satellite communications system. For one thing, a satellite in a lower orbit experiences atmospheric drag significant enough to cause it to steadily decrease in altitude until it burns up in the atmosphere. "Satellite Orbital Lifetimes," Australian Space Academy (https://www.spaceacademy.net.au/watch/debris/orblife.htm, last visited Jun. 14, 2021), explains that a satellite's orbit will decay in inverse proportion to the ratio of its mass to the drag force exerted by the atmosphere. In other words, the heavier the satellite and the smaller its drag coefficient, the slower its orbit will decay. And although LEO and VLEO communication satellites can be relatively heavy, it is believed that few are configured to decrease drag. For example, Starlink® satellites weigh about 500 lbs., "Starlink," Wikipedia (https://en.wikipedia.org/wiki/Starlink, last visited Jun. 16, 2021), but it appears from published sources that no attempt has been made to configure the satellite body to mitigate drag. Moreover, like many—if not most—satellites, Starlink® satellites include large, flat, outwardly extending solar panel arrays that increase drag even further.

Space-based communications systems commonly require that satellite nodes be at fixed attitudes and at known locations relative to each other in order to establish satellite/satellite and ground/satellite radio connections. This requires that the satellites include some sort of propulsion system and control electronics, which further increases their size, cost, and complexity. These things also increase satellite weight, which decreases orbital decay, but a propulsion system is still required to maintain them at known relative locations to support satellite-to-satellite communications. These factors all contribute to the billions of dollars being projected for providing satellite-based communications, per the Long article above. Aside from the enormous cost of deploying thousands of expensive satellites, VLEO satellites must also take into account that the International Space Station is in a 250 mile orbit. A higher orbit sacrifices signal strength, while a lower orbit requires more frequent boosts to maintain the satellite in orbit. This burns rocket fuel and reduces satellite life, necessitating deployment of a high cost replacement.

The assignee of the inventions described herein has numerous prior applications and patents based on a completely different paradigm than heretofore known in satellite communications. U.S. Pat. No. 10,084,536 issued Sep. 25, 2018 ("the '536 patent"), discloses LEO satellites in uncontrolled orbits and without attitude control, and which thus do not need heavy rockets or other thrusters, or their fuel. The assignee's satellites are essentially just platforms for radios and antennas for radio transmissions. They have batteries for power and solar panels, but it is anticipated that they can be engineered so that their power needs will not require large arrays of solar panels like those in conventional satellites. Their antennas broadcast and receive in multiple directions around the satellite to enable satellite/satellite and ground/satellite radio links for data transmission to be established on a probabilistic basis without the satellites necessarily knowing their locations relative to each other or to ground stations.

Other patents and applications of the assignee refined and extended the technological breakthroughs represented by the '536 patent. U.S. Pat. No. 10,447,381 issued Oct. 15, 2019, discloses spinning the satellites around an axis at about one revolution per second. This provides within a one-second time period additional chances to incorporate a particular satellite into a data transmission route. U.S. Pat. No. 10,085,200 issued Sep. 25, 2018, and U.S. Pat. No. 10,291,316 issued May 14, 2019, disclose numerous refinements, variations, and improvements of some of the basic concepts in the preceding patents, including the use of antennas with multiple feeds (the '200 patent), and systems in which each satellite knows its own orbit, and shares the information with other satellites (the '316 patent) to provide a directional bias to assist in route creation. Provisional application No. 63/182,341 filed Apr. 30, 2021, and application Ser. No. 17/322,950 filed May 18, 2021 ("the '950 application"), describe complex routing and data transmission protocols particularly adapted to increase the utility and extend the utility of the assignee's earlier patents and applications already mentioned. The '950 application includes a more comprehensive review of the assignee's satellite communication technology.

Of particular relevance to the systems and methods described in the present document is the assignee's U.S. Pat. No. 10,979,136 issued Apr. 13, 2021 ("the '136 patent"). Of particular relevance to the present disclosure is the '136 patent's disclosure of various satellite constructions shown in FIGS. 12-21 and described in the accompanying text. These portions of the '136 patent describe satellites that can be made light and compact and thereby reduce launch costs, while still being capable of implementing the various improved route creation and data transmission protocols that form some of the most significant aspects of the assignee's communications systems and methods. These satellites are maintained in particular attitudes (within limits), but they do not require thrusters and fuel for that purpose. The satellite attitude control techniques described in the '136 patent are adapted for use in satellites embodying aspects of the new satellite constructions discussed further below.

LEO and VLEO satellites are subject to drag even though they are above the region of the atmosphere where conventional aerodynamic drag is a factor. The physics of drag forces on LEO and VLEO satellites is discussed in Majid, A, et al., "Aerodynamic Drag Computation of Lower Earth Orbit (LEO) Satellites," *Journal of Space Technology*, vol. 8, no. 1, pp. 82-89 (July 2018). At LEO and VLEO altitudes classic drag models do not apply because an orbiting body encounters the air more as discrete particles at the molecular level rather than as a flow continuum in which the Navier-Stokes equations are applicable. *Majid*, pp. 83-84. The article discusses various methods for calculating the drag coefficient $C_D$ of a sphere and a cube in this region of the atmosphere.

It is believed that only a very limited number of satellites have been designed to decrease their drag coefficients. The "Satellite Orbital Lifetimes" monograph already cited explains that an object in orbit will decelerate at a rate proportional to the ratio $F_D/m$, where $F_D$ is the drag on the object and m is its mass. In turn, $F_D$ is a function of the drag coefficient $C_D$ and the cross-sectional area A of the object (normal to its velocity vector). By the same token, Walsh, J., "Reducing Spacecraft Drag in Very Low Earth Orbit through Shape Optimization," $7^{th}$ *European Conf. for Aeronautics and Aerospace Sciences* (*EUCASS*) (Copyright 2017), calculates the drag coefficients exhibited by various cylindrical shapes with tapering conical nose and tail sections in the direction of travel. Table 3 shows that drag coefficient decreases with more tapered nose cones. However, the "satellites" were modeled without any exterior equipment or solar arrays, which significantly increase drag and thus decrease satellite time in orbit.

Again, the paradigm to which all of these prior systems belong relies on satellites with onboard orbit-boosting propulsion systems for negating the inevitable orbital decay caused by the considerable atmospheric drag resulting from the large solar panel arrays needed to produce electrical power to recharge their batteries. And in the case of communication satellites, they must be maintained at fixed positions relative to each other, requiring even more elaborate propulsion systems to stabilize them in all three axes. All of this makes the satellites more complex, which adds to unit satellite cost; extremely heavy, which adds to launch cost; and expensive to replace when they eventually run out of fuel or their propulsion systems malfunction.

The satellite constructions described below address these shortcomings via practicable LEO/VLEO satellites configured to maximize orbital lifetime while supporting and improving the advantageous route creation protocols and data transmission methods described in the assignee's prior patents and applications cited above. The disclosed satellite constructions avoid the use of onboard propulsion systems, such as thrusters and rocket fuel tanks, which not only increase satellite cost, but also require that satellites be large enough to accommodate them. Larger satellites will experience more atmospheric drag, particularly in LEO/VLEO orbits, which reduces satellite life in orbit, and communication satellites typically have large, projecting solar panel arrays, which increase drag even more. The assignee has already described in its previous patents and applications less costly, compact satellites with built-in solar panels that can support communications. The satellite constructions described herein improve on those satellites. They also can reduce the cost of maintaining a constellation in which the satellites are in orbits at altitudes below the International Space Station.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

The entire section entitled "Definitions" in the '136 patent is incorporated herein. The below description uses the new term "streamlined" to describe the configuration of preferred satellite embodiments of the claimed subject matter. This term refers to the characteristic shape of the satellite that is designed to reduce or minimize the drag caused by air as an object moves though the medium in which it is immersed, in this instance the atmosphere at the satellite's orbital altitude. A preferred configuration will be "streamlined" by a casing with rounded edges that encloses all or most of the satellite components to reduce wind drag and increase orbital life. As will become clearer as the below description proceeds, this does not exclude the presence of small protrusions or raised portions formed by satellite components necessary for operational purposes in various applications.

Figure 1:
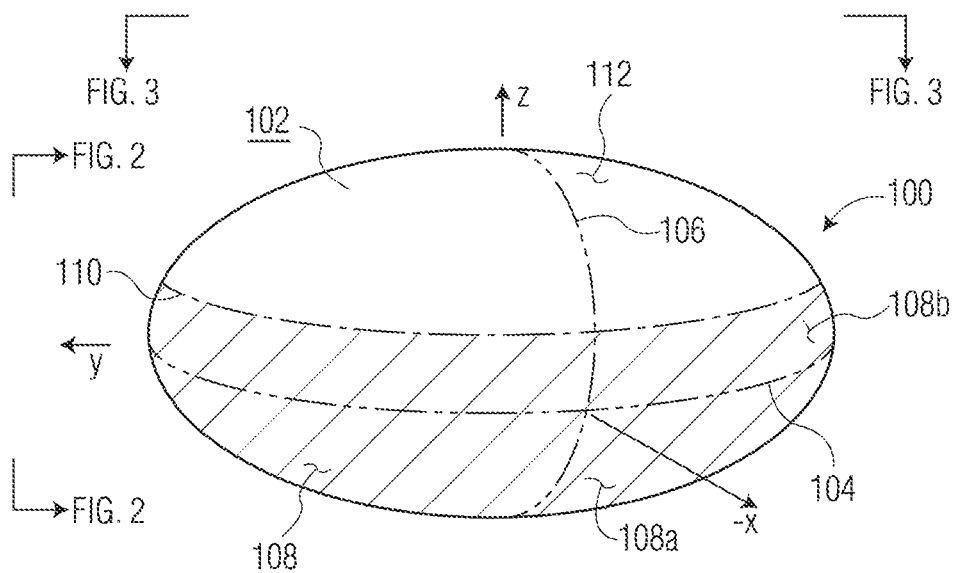
FIG. 1 is an isometric depiction of an LEO/VLEO satellite configured to minimize aerodynamic drag defining an x, y, z right-hand coordinate system with the y-axis in the nominal direction of travel of the satellite in orbit.
Figure 2:
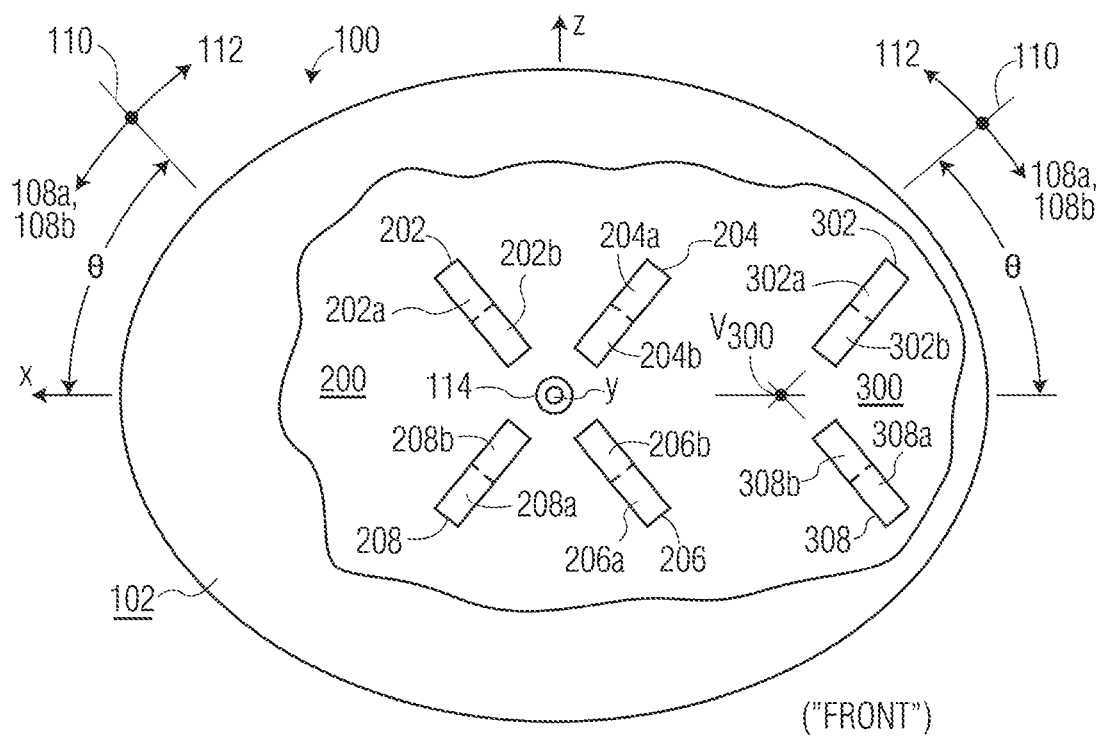
FIG. 2 is a cut-away front view of the satellite in FIG. 1 illustrating components of attitude stabilizing and attitude controlling mechanisms disposed in a plane normal to the satellite's direction of travel in orbit.
Figure 3:
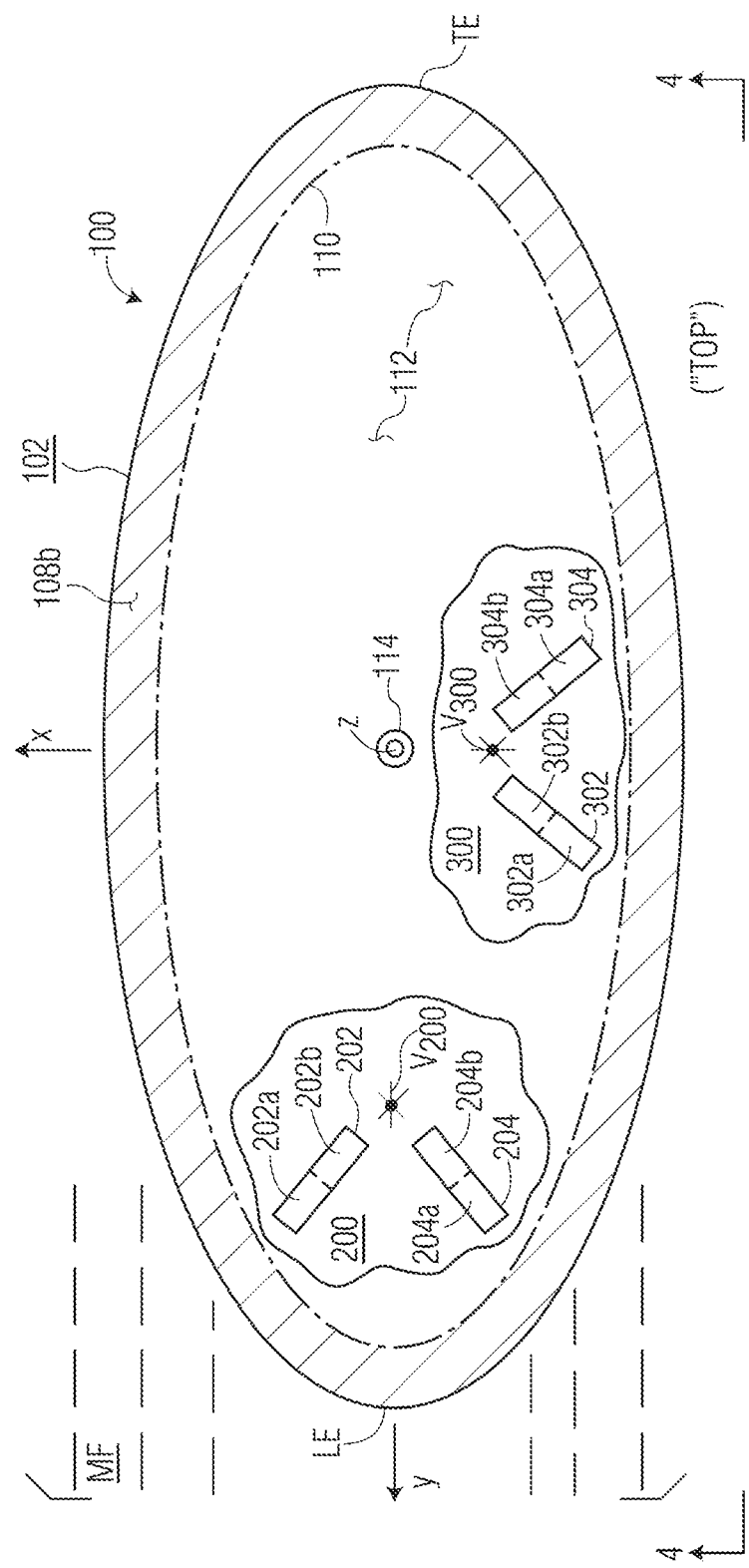
FIG. 3 is a cut-away top view of the satellite in FIG. 1 illustrating components of the attitude stabilizing and attitude controlling mechanisms in a plane normal to the x-y plane in FIG. 1.

FIGS. 1-4 depict a satellite 100 with a casing 102 in which substantially all of the satellites' components are contained. In particular, the satellite 100 will generally include the operational modules described in the '136 patent in connection with its FIG. 3. FIG. 1 illustrates the right-handed x, y, z coordinate system used in the present description. The positive y-axis points along the satellite's orbital path and defines the satellite's longitudinal axis. FIG. 2 depicts the satellite viewed in the negative y-direction, as indicated by the concentric circles depicting the y-axis directed outwardly from the plane of the drawing in this view. The casing 102 is also elliptical in this view, with the x- and z-axes intersecting with the y-axis at the center of the ellipse, thus forming the origin of the coordinate system. FIG. 3 is a view from the "top" of the satellite 100, that is, in the negative z-direction, as indicated by the concentric circles depicting the z-axis directed outwardly from the plane of the paper. It will be understood that terms such as "top" and "bottom" or "above" and "below" are used for convenience to indicate directions facing away from and toward the surface of the earth, respectively, when the satellite is in its operational orientation. Likewise, the term "side" is relative to "top" and "bottom."

In the present embodiment the casing is symmetrical in the x-z plane (FIG. 2), the x-y plane (FIG. 3), and the y-z plane (FIG. 4), meaning that in each such plane the casing cross-section is symmetrical about the orthogonal axes in the plane. The "equator" 104 and the "zero meridian" 106 of the casing 102 are drawn in dash-two-dot lines in FIG. 1 to facilitate the following description of the operational and constructional features of the satellite 100. The satellite 100 includes an antenna array 108 that comprises a plurality of directional antennas in the cross-hatched region labeled as such in the figures. The antennas generally point in directions along axes that pass through the origin 114 of the satellite. The individual antennas are not depicted in the figures because they can assume any configuration and have any operational characteristics that will enable route creation and data transmission as described in the assignee's prior patents and applications, preferred examples of which are described in detail in the '136 patent and the '950 application. A salient feature for purposes of the discussion here is that little or no antenna structure protrudes from the streamlined surface of the casing 102. In a preferred implementation, the antennas comprise parabolic reflectors, optionally including multiple feeds per antenna, as described in the '136 patent. To maintain the streamlined configuration, the antenna mouths may be recessed below the streamlined surface of the casing and covered by a material that is transparent to the type of radio signals being transmitted and received, as discussed in the '136 patent.

The antenna array 108 includes a first primary portion 108a below the satellite equator 104 and, for reasons described in detail further below, a second supplemental portion 108b that extends through a predetermined angle θ above the equator 104 to an antenna reference line 110, thereby covering the surface of the satellite below the reference line 110. In one embodiment, $0° \leq \theta \leq 45°$, and preferably $0° \leq \theta \leq 30°$. The remainder of the top of the satellite 110 has one or more solar panels in the fashion described in connection with FIGS. 14 and 18 of the '136 patent. As with the antennas, the solar panels are constructed and mounted in a way that maintains to the greatest extent possible the smooth, streamlined surface of the casing. It will be understood that certain manufacturing practices or engineering considerations may make it impracticable to mount the antennas and solar panels in a way that presents a perfectly smooth and streamlined surface. A satellite surface with minor protrusions and irregularities that do not add appreciably to the coefficient of drag of the satellite will still meet the definition of "streamlined" as used herein.

To facilitate explanation of the features of the satellite relevant to the present discussion the satellite 110 is depicted as a regular ellipsoid with a major axis defined by the y-axis, and minor axes along the x- and z-axes. The coordinate axes thus intersect at an origin 114 at the geometric center of the satellite 110. It will be appreciated that the satellite can assume other streamlined configurations within the scope of the invention. For example, it may be advantageous to make the casing circular or other shape in the x,z plane to better accommodate the components of the satellite required to perform the route creation and data transmission functions described in the assignee's previous patents and applications referred to above. In that regard, the satellite 102 in the present embodiment will include at least the circuit components and the power module depicted in '136 patent FIG. 3 and described in the accompanying text at column 9, line 59, to column 11, line 4. As already noted, the satellite 100 includes an antenna array 108, the antennas of which are operatively connected to the satellite central processing unit as described in the '136 patent, and plural solar panels 112 for recharging batteries in the power module in the same manner as the differently configured solar panels in the '136 patent cooperate with the power module depicted in '136 patent FIG. 3.

One important feature of the satellite 100 is an internal attitude stabilizing mechanism 200 for maintaining the y-axis of the satellite pointing generally in the direction of travel as the satellite orbits the earth to take advantage of the streamlined shape of the casing 102 to minimize aerodynamic drag, and thus enhance the satellite's operational life. The attitude stabilizing mechanism in the present embodiment comprises four electromagnetic stabilizing members 202, 204, 206 and 208 depicted through cutouts in the casing 102. The members lie on an imaginary circular cone with its central axis on the satellite's y-axis and a 90° internal opening angle (see FIGS. 3 and 4). To assist in orienting the reader, the vertex $V_{200}$ of the cone is labeled in FIGS. 3 and 4. The stabilizing members are depicted as rods comprising a ferromagnetic material that are equally distributed (that is, 90° apart) around the "surface" of the cone and form 45° angles with the y,x plane and the y,z plane, best appreciated in the front view of the stabilizing mechanism in FIG. 2. Each electromagnetic member includes a ferroelectric rod made of a suitable ferroelectric material with two portions. An outer portion of each rod, designated with the letter "a" (202a, 204a, 206a, and 208a), is wound in a first direction with a current carrying wire (not shown), and an inner portion designated with the letter "b" (202b, 204b, 206b, and 208b) is wound with a current carrying wire wound in the opposite direction from its associated "a" portion.

Figure 4:
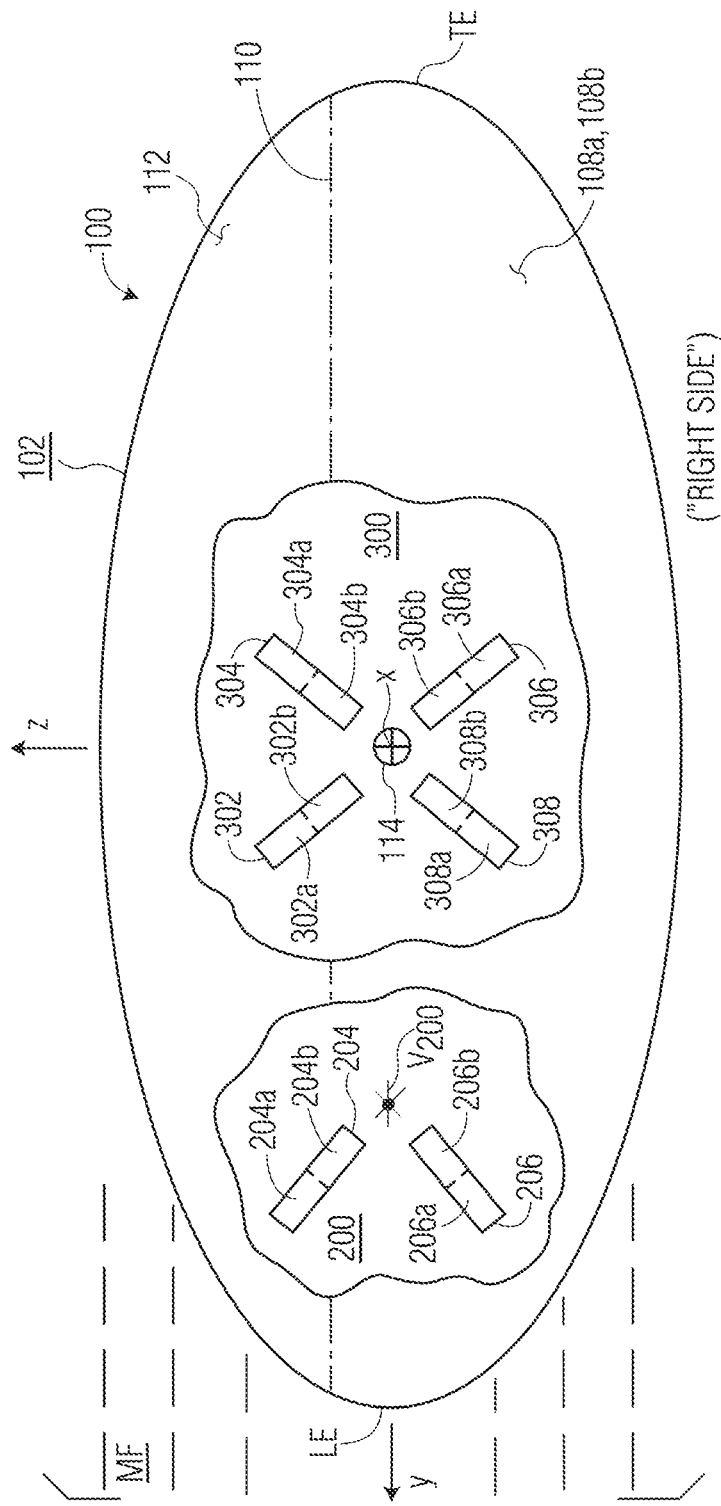
FIG. 4 is a cut-away view from the side of the satellite in FIG. 1 illustrating components of the attitude stabilizing and attitude controlling mechanisms in a plane normal to y-z plane in FIG. 1.

FIGS. 3 and 4 illustrate the magnetic flux MF of the earth when the satellite 100 is in a substantially circular polar orbit such the satellite S100P depicted in FIG. 4 of the '136 patent. In this particular deployment the attitude alignment mechanism 200 can align the satellite's y-axis with its orbital direction to take advantage of the reduced drag provided by the satellite's streamlined casing 102. To facilitate this description it is assumed that the center of mass of the satellite 100 is at the origin 114 of the x, y, z coordinates.

The "a" coils of the electromagnetic members 202 are wound so that passing current through them creates a magnet with the north pole facing outwardly from the vertex $V_{200}$; conversely, the "b" coils are wound so that passing a current through them creates a magnet with its south pole facing outwardly from the vertex $V_{200}$. In an alternate embodiment, the members are wound with a single wire and their magnetic orientation is determined by switching the direction of the current through the wires.

When the satellite 100 (S100P) is in the Western Hemisphere, moving northward, the "a" coils are actuated to create magnets with their poles aligned with the rods comprising each of the stabilizing members 202, 204, 206 and 208. In the presence of the earth's magnetic field MF (the south pole of which is at the North Magnetic Pole) they will create forces with components normal to the lines of flux to hold the vertex $V_{200}$ in the x-y plane (via the member pairs 202, 208 and 204, 206) and in the y-z plane (via the member pairs 202, 204 and 206, 208). The combined force of all of the members created by the northward attraction of the north poles of the members 202-208 to the south pole of the earth's magnetic field (at the North Magnetic Pole) maintains the satellite's leading end LE directed in the +y direction. When the GNSS module in the satellite (see FIG. 3 of the '136 patent) indicates that the satellite has entered the Eastern Hemisphere and is moving southward, the "b" coils are actuated and the members 202-208 interact with the earth's magnetic field to maintain the satellite directed toward the south pole in the same fashion as the "a" coils interact with the earth's north pole. The satellite's y-axis will be maintained in the orbital direction because the vertex $V_{200}$ and the satellite's center of mass at the origin 114 of the x, y, z coordinate system are both on the y-axis, thereby eliminating any moment on the satellite about the x- or z-axis created by the members 202-208.

It will be appreciated that an attitude stabilizing mechanism as described in the various appended claims can assume forms different from the embodiment just described. For example, the embodiment just described is particularly adapted to a satellite in which the center of mass coincides with the origin of a right-hand coordinate system. This will eliminate moments about any of the axes when the applied stabilizing forces resolve into a vector along the satellite's direction of travel of the satellite and through the center of mass. As noted at the outset, increasing the weight of the satellite will increase its time in orbit, so that non-ferromagnetic ballast can be added to the satellite to increase its weight and provide the preferred weight distribution by which the satellite's centroid coincides with its center of mass. The efficacy of the stabilizing mechanism can be further improved by concentrating more mass at its leading and trailing ends, such as by locating the batteries in these areas of the satellite. This will to tend to maintain the y-axis of the satellite traveling in the direction of travel.

In addition, the satellite casing can also assume different shapes consistent with the provision of the internal components required for operation. In the embodiment described thus far, the satellite is symmetrical about all three axes. However, the satellite can also assume a shape that is axisymmetric only about the y-axis, such as a teardrop shape, which may further decrease drag (see Walsh, cited above), since an attitude stabilizing mechanism such as that described above will automatically align the proper end of the satellite in the direction of travel. This effect can be enhanced by providing a second attitude stabilizing mechanism proximate to the satellite trailing end TE. This can also compensate for slight mismatches of the center of mass with the satellite centroid by providing stabilizing forces at both ends of the y-axis.

Steady-state actuation of the stabilizing members 202-208 in the fashion just described will align the y-axis of the satellite with the earth's magnetic field with the satellite leading end 114 facing in the direction of travel and the x,z plane normal to the direction of travel. However, although the members 202-208 can maintain the satellite in this orientation, it is also necessary to ensure that it is oriented with the solar panels 112 on top and the antenna array 108 oriented to enable communication with the ground and other satellites as already described.

To that end, the satellite's angular orientation about the y-axis is controlled by an attitude controlling mechanism 300, which in the present embodiment is an analog of the attitude stabilizing mechanism 200. It comprises four electromagnet stabilizing members 302, 304, 306 and 308 depicted through cutouts in the casing 102. The members lie on an imaginary circular cone with its central axis on the satellite's x-axis and a 90° internal opening angle (see FIGS. 2 and 3). To assist in orienting the reader, the vertex V300 of the cone is labeled in FIGS. 2 and 3, and lies on the x-axis. The members are equally distributed (that is, 90° apart) around the "surface" of the cone and form 45° angles with the x,y plane and the x,z plane, best appreciated in the "frontal" view of the stabilizing mechanism in FIG. 4. Each controlling electromagnetic member includes a ferroelectric rod made of a suitable ferroelectric material with two portions. An outer portion of each rod, designated with the letter "a" (302a, 304a, 306a, and 308a), is wound in a first direction with a current carrying wire (not shown), and an inner portion designated with the letter "b" (302b, 304b, 306b, and 308b) is wound with a current carrying wire wound in the opposite direction from its associated "a" portion. As with the stabilizing mechanism 200, each of the controlling members 302-308 in an alternate embodiment can be wound with a single wire whereby their magnetic orientation is determined by switching the direction of the current through the wires.

Selective actuation of the controlling members 302-308 will attract the members toward the earth's magnetic poles in the same fashion as described in connection with the stabilizing members 202-208, and in so doing will produce a moment about the y-axis if it is in substantial alignment with the earth's magnetic field, thus controlling the angle of the satellite's x-y axis relative to the earth's surface. This may result in a slight tendency toward misalignment of the satellite's y-axis with its direction of travel, but the alignment mechanism can compensate for that tendency.

In operation the stabilizing mechanism 200 and controlling mechanism 300 work together to orient the satellite with the y-axis nominally along the orbital path with the leading end E pointing in the direction of travel and with the solar panels on top. In the present embodiment this is enabled in the first instance by providing plural solar panels arranged in an array of multiple units, the electrical output of each of which is separately monitored. In a preferred implementation the solar panels the satellite's GNSS circuitry will know the satellite's location relative to the earth's surface and the time of day. The satellite will include a look-up table based on the angle of the sun relative to the satellite at that location and time of day, and the satellite will include circuitry that can determine in how much electrical current should be generated by each of the solar panels if they are on top of the satellite with the satellite traveling in the orbital direction with its leading end in the front. An algorithm in the satellite's processor can determine by how much the satellite must be rotated in around each of the three axes to place it in the desired orientation. In a preferred embodiment this can be performed using a feedback control system in which the satellite's actual orientation, as indicated by the outputs from the individual solar panel units, is compared to its desired orientation as indicated by the target solar panel unit outputs. Note that the target outputs will have to be updated as the as the aligning process proceeds since the relative positions of the sun and satellite will be continuously change.

As already indicated, one advantageous embodiment comprises a constellation of multiple satellites with the above described construction deployed in multiple polar orbital paths to enable route creation and data transmission via the various protocols and methods in the applicant's previous applications. (A "polar orbit" as used herein refers to an orbit along a pole-to-pole longitude.) The orientation controlling mechanism is particularly advantageous because it can maintain the satellite in an angular orientation by changing the tilt angle of the x-y plane relative to the earth's surface to point more satellite antennas particular locations on the ground. As noted, a satellite's GNSS circuitry will know the satellite's location relative to the earth's surface. Thus, a satellite in orbital path OP6p (see FIG. 4 of the '136 patent) can be tilted so that more antennas are available for satellite/ground communications as it passes to the east of the U.S., while not affecting communications in an easterly direction where there are few or no terrestrial nodes/ground stations. By using the feedback control system described above, the satellite can be brought to and maintained in a desired tilt angle $\varphi$ relative to the earth's surface. In a preferred embodiment $\varphi \le \theta$ (see FIG. 3). In this fashion, the satellite presents more antennas to a given area on the earth's surface. In addition, more of the antennas in the portion 108b of the antenna array above the satellite equator 104 are available for satellite-to-satellite links. In a further advantageous adaptation the satellite stores the locations of the individual antennas making up the antenna array 108. Since the satellite knows its tilt angle $\varphi$ from the outputs of the individual solar panel units, so that the antennas actually pointing to the desired area on the surface can be utilized in favor of the remaining antennas. This selective pointing feature also allows the satellite to use antennas with narrower beam widths to transmit stronger, more focused beams, enabling more reliable communications with terrestrial nodes having limited power, such as Internet of Things sensors and personal devices such as smartphones.

Likewise, if a satellite is over an area such as the middle of the Atlantic or Pacific Ocean where there are few terrestrial nodes to either side of its orbital path, it can be tilted so that its solar panels face the sun (assuming the satellite is in daylight) to maximize the electrical current they generate to recharge the satellite's batteries. This reduces the number of solar panels needed to keep the batteries charged and makes the compact construction of the satellite enabling it to be streamlined and be made smaller thereby reducing drag and increasing satellite life.

The satellite 100 can also be used to enhanced effect in "near-polar orbits" with an angle of orbital inclination from the longitudinal of $0° < \alpha \le 15°$, where $\alpha = 0°$ defines a "true polar orbit" that forms a 90° angle with the earth's equator. Such near-polar orbits will have increased utility since a constellation of a given number of satellites will be accessible to more people in populated areas even though the sparsely populated polar regions will have less access. The same attitude stabilizing mechanism and attitude controlling mechanisms can be used in satellites in such near-polar orbits since the satellite's y-axis is only slightly different from its orbital direction. By the same token, tilting the satellite using the attitude controlling mechanism will have the virtually the same effect as when the satellite is in a true polar orbit, in that it will enhance ground communications and battery recharging in the same fashion as in a true polar orbit.

It will be understood that other variations and modifications of the various preferred satellite constructions described above are within the scope of this disclosure. For example, the attitude stabilizing mechanism and attitude controlling mechanism can be realized in ways other than the electromagnet arrays 200 and 300 described above in connection with FIG. 2-4. While it is preferable to use electromotive applications in these mechanisms, the present disclosure is not so limited. One alternate embodiment could use momentum wheels or solenoid-actuated mechanisms to the same purposes. Stated another way, these mechanisms can comprise electrically controlled mechanical devices in addition to or in combination with purely electromagnetic devices to perform the functions described herein. They can include movable parts or be realized without using movable parts, and can comprise any construction equivalent to any of those described herein that can perform the functions of the attitude stabilizing mechanism and attitude controlling mechanism according to the embodiments specifically described.

In another variation, the satellite constructions described herein can be adapted for interconnecting LEO/VLEO satellites with a GEO satellite "backbone" to improve communications between the GEO satellites and terrestrial nodes, particularly smaller handheld or other personal communication devices. In this application the satellites would include one or more antennas on the top that could be pointed toward an overhead GEO satellite to provide an intermediate link with multiple terrestrial nodes. Since a satellite constricted in that fashion would know its position relative to the GEO satellite, it could actuate its stabilizing and controlling mechanisms accordingly to point its one or more antennas on top at the GEO satellite.

Those skilled in the art will readily recognize that only selected preferred embodiments of the invention have been depicted and described, and it will be understood that various changes and modifications can be made other than those specifically mentioned above departing from the spirit and scope of the invention, which is defined solely by the claims that follow.

What is claimed is:

1. A satellite for incorporation in a constellation of multiple said satellites to be used in a radio communication system for transmitting data via a radio route comprising at least one said satellite as a node of said radio route, said satellite comprising:

a casing having an outer surface and a longitudinal axis defining the y-axis of a right-handed x,y,z coordinate system with respective orthogonal x-z, x-y and y-z planes, said casing containing (i) a plurality of antennas for receiving and transmitting radio signals, (ii) at least one rechargeable battery, (iii) at least one solar panel for recharging said battery, (iv) an attitude controlling mechanism, and (v) control circuitry for selectively energizing said attitude controlling mechanism, wherein:

said control circuitry selectively connects said at least one battery to said attitude controlling mechanism for controlling an angle of the x-y plane of said casing relative to the earth's surface with the z-axis pointing generally away from the earth to define an upward facing casing outer surface including said at least one solar panel and a downward facing casing outer surface including said antennas;

said outer surface of said casing is streamlined to reduce aerodynamic drag on the satellite; and said casing cross-section is symmetrical in all three of said planes.

2. A satellite as in claim 1, wherein the constellation includes a plurality of said satellites in substantially circular orbits that are less than about 1,000 miles from the earth's surface.

3. A satellite as in claim 1, wherein the constellation includes a plurality of said satellites in substantially circular orbits that are less than about 250 miles from the earth's surface.

4. A satellite as in claim 1, wherein said antennas comprise an array of multiple directional antennas pointing in multiple directions.

5. A satellite as in claim 2, wherein the satellite has a center of mass at the centroid of the satellite.

6. A satellite as in claim 5, wherein:

said casing has an equator at the x-y plane; and said antennas comprise a primary antenna array including multiple primary antennas disposed below said equator and a supplemental antenna array comprising multiple supplemental antennas disposed above said equator in a region defined by a reference line forming an angle θ with the x-y plane.

7. A satellite for incorporation in a constellation of multiple said satellites to be used in a radio communication system for transmitting data via a radio route comprising at least one said satellite as a node of said radio route, said satellite comprising:

a casing having an outer surface and a longitudinal axis defining the y-axis of a right-handed x,y,z coordinate system with respective orthogonal x-z, x-y and y-z planes, said casing containing (i) a plurality of antennas for receiving and transmitting radio signals, (ii) at least one rechargeable battery, (iii) at least one solar panel for recharging said battery, (iv) an attitude controlling mechanism, and (v) control circuitry for selectively energizing said attitude controlling mechanism, wherein:

said control circuitry selectively connects said at least one battery to said attitude controlling mechanism for controlling an angle of the x-y plane of said casing relative to the earth's surface with the z-axis pointing generally away from the earth to define an upward facing casing outer surface including said at least one solar panel and a downward facing casing outer surface including said antennas;

said attitude controlling mechanism comprises a plurality of electromagnetic controlling members and said control circuitry selectively actuates said electromagnetic controlling members for controlling a tilt angle φ of the satellite's x-y plane relative to the earth's surface; and said outer surface of said casing is streamlined to reduce aerodynamic drag on the satellite.

8. A satellite as in claim 7, wherein said electromagnetic controlling members include rods with conducting coils selectively connected with said at least one battery.

9. A satellite as in claim 7, wherein:

said casing cross-section is symmetrical in all three of said planes and has an equator at the x-y plane;

said antennas comprise a primary antenna array including multiple primary antennas disposed below said equator and a supplemental antenna array comprising multiple supplemental antennas disposed above said equator in a region defined by a reference line forming an angle θ with the x-y plane; and said control circuitry is operable to maintain the x-y plane of said satellite antenna array at a predetermined value of φ≤θ.

10. A satellite as in claim 9, wherein said satellite includes GNSS circuitry in said casing for determining the location of said satellite relative to the earth's surface and said attitude controlling mechanism maintains the tilt angle φ at a value determined in accordance with the location of the satellite relative to the earth's surface.

11. A satellite as in claim 10, wherein the GNSS circuitry determines the time of day at the location of the said satellite and said attitude controlling mechanism maintains the tilt angle φ at a value determined in accordance with the location of the satellite relative to the earth's surface and the time of day at said location.

12. A satellite for incorporation in a constellation of multiple said satellites to be used in a radio communication system for transmitting data via a radio route comprising at least one said satellite as a node of said radio route, said satellite comprising:

a casing having an outer surface and a longitudinal axis defining the y-axis of a right-handed x,y,z coordinate system with respective orthogonal x-z, x-y and y-z planes, said casing containing (i) a plurality of antennas for receiving and transmitting radio signals, (ii) at least one rechargeable battery, (iii) at least one solar panel for recharging said battery, (iv) an attitude controlling mechanism, (v) an attitude stabilizing mechanism, and (vi) control circuitry for selectively energizing said attitude controlling mechanism, wherein;

said control circuitry selectively connects said at least one battery to said attitude stabilizing mechanism for urging said satellite into an operational attitude with the y-axis of the casing traveling in an orbital path;

said control circuitry selectively connects said at least one battery to said attitude controlling mechanism for controlling an angle of the x-y plane of said casing relative to the earth's surface with the z-axis pointing generally away from the earth to define an upward facing casing outer surface including said at least one solar panel and a downward facing casing outer surface including said antennas; and said outer surface of said casing is streamlined to reduce aerodynamic drag on the satellite.

13. A satellite as in claim 12, wherein said control circuitry maintains the satellite in an orbit with the satellite y-axis having an orbital inclination with a predetermined angle of inclination a relative to a true polar orbit, wherein α≤15°, a being the angle formed by the satellite's orbital path at the earth's equator, and α=0° defining a true polar orbit.

14. A satellite as in claim 13, wherein:

said casing is symmetrical in all three of said planes and has an equator at the x-y plane;

said antennas comprise a primary antenna array including multiple primary antennas disposed below said equator and a supplemental antenna array comprising multiple supplemental antennas disposed above said equator in a region defined by a reference line forming an angle θ with the x-y plane;

said attitude controlling mechanism comprises a plurality of electromagnetic controlling members and said control circuitry selectively actuates said electromagnetic controlling members for urging the satellite's y-axis into alignment with the earth's magnetic field;

said attitude controlling mechanism comprises a plurality of electromagnetic controlling members and said control circuitry selectively actuates said electromagnetic controlling members for controlling a tilt angle $\varphi$ of the satellite's x-y plane relative to the earth's surface; and said primary and secondary antennas comprise an array of multiple directional antennas pointing in multiple directions, said control circuitry being operable to maintain the x-y plane of said satellite at a predetermined value of $\varphi \leq \theta$.

* * * * *